(12) United States Patent
Gamboa et al.

(10) Patent No.: US 12,199,428 B2
(45) Date of Patent: Jan. 14, 2025

(54) METHOD FOR OPERATING AN ELECTRICAL STORAGE STATION

(71) Applicant: Wobben Properties GmbH, Aurich (DE)

(72) Inventors: Daniel Gamboa, Aurich (DE); Sönke Engelken, Bremen (DE); Aubai Al Khatib, Aurich (DE)

(73) Assignee: WOBBEN PROPERTIES GMBH, Aurich (DE)

( * ) Notice: Subject to any disclaimer, the term of this patent is extended or adjusted under 35 U.S.C. 154(b) by 521 days.

(21) Appl. No.: 17/639,242

(22) PCT Filed: Aug. 20, 2020

(86) PCT No.: PCT/EP2020/073416
§ 371 (c)(1),
(2) Date: Feb. 28, 2022

(87) PCT Pub. No.: WO2021/037690
PCT Pub. Date: Mar. 4, 2021

(65) Prior Publication Data
US 2022/0329069 A1    Oct. 13, 2022

(30) Foreign Application Priority Data

Aug. 30, 2019    (DE) .................... 10 2019 123 383.6

(51) Int. Cl.
*H02J 3/00*        (2006.01)
*H02J 3/32*        (2006.01)
(52) U.S. Cl.
CPC ............. *H02J 3/004* (2020.01); *H02J 3/003* (2020.01); *H02J 3/32* (2013.01); *H02J 2300/28* (2020.01)

(58) Field of Classification Search
CPC .... H02J 3/004; H02J 3/003; H02J 3/32; H02J 2300/28; Y02E 10/56; Y02E 10/72; Y04S 10/50

See application file for complete search history.

(56) References Cited

U.S. PATENT DOCUMENTS

2011/0221276 A1    9/2011   Geinzer et al.
2014/0184136 A1    7/2014   Ture
(Continued)

FOREIGN PATENT DOCUMENTS

DE    10 2014 221 555 A1    4/2016
EP       3 007 302 A1        4/2016
(Continued)

*Primary Examiner* — Mohammad Ali
*Assistant Examiner* — Sheela Rao
(74) *Attorney, Agent, or Firm* — Seed IP Law Group LLP

(57) ABSTRACT

Provided is a method for operating an electrical storage station on an electrical supply network. The network has electrical consumers, the storage station, and at least one wind power installation to generate electrical power from wind. The method includes generating electrical power by way of the installation as generated wind power, and feeding a feed-in power into the network. The electrical feed-in power at least results from the generated wind power and a storage power taken up or output by the storage station. The feeding of the feed-in power into the network is controlled depending on a station state of charge and a wind and/or power forecast. Changes in the feed-in power over time are controlled depending on the wind and/or power forecast and a limit gradient is specified to limit the changes in the feed-in power thereto. The limit gradient is specified depending on the wind and/or power forecast.

18 Claims, 3 Drawing Sheets

(56) References Cited

U.S. PATENT DOCUMENTS

| | | |
|---|---|---|
| 2014/0200723 A1 | 7/2014 | Roy et al. |
| 2015/0330365 A1* | 11/2015 | Deb ........................ F03D 9/257 |
| | | 700/287 |
| 2017/0317521 A1 | 11/2017 | Anderlohr et al. |
| 2018/0223804 A1 | 8/2018 | Badrinath Krishna et al. |
| 2018/0306169 A1* | 10/2018 | Dharmadhikari ......... H02J 3/32 |
| 2019/0052088 A1 | 2/2019 | Johansson et al. |
| 2020/0052628 A1 | 2/2020 | Busker et al. |

FOREIGN PATENT DOCUMENTS

| | | |
|---|---|---|
| WO | 2011/140111 A2 | 11/2011 |
| WO | 2017/045698 A1 | 3/2017 |
| WO | 2018/078086 A1 | 5/2018 |

* cited by examiner

METHOD FOR OPERATING AN ELECTRICAL STORAGE STATION

BACKGROUND

Technical Field

The present invention relates to a method for operating an electrical storage station on an electrical supply network. The present invention furthermore relates to a storage station.

Description of the Related Art

Electrical storage stations, on which the disclosure is based, can provide electrical power on an electrical supply network, specifically can feed it in when required. Electrical storage stations are of particular importance when they are operated in what is known as an island network. An electrical supply network is referred to as an island network when it is comparatively small and isolated. Here, an island network can frequently actually also exist and be operated on a geographic island or group of islands, such as on the Faroe Islands, for example.

Ideally, such island networks are mainly operated using regenerative energy. Wind power installations and photovoltaic systems in particular then feed electrical power into the electrical supply network, which can be subject to strong fluctuations due to weather and time of day. Such power fluctuations can be compensated for by electrical storage stations on which the disclosure is based. In addition, fossil fuels are used to generate power, particularly using one or more diesel generators to provide energy that cannot be delivered by renewable sources.

Such an island network can be operated, for example, in such a way that a portion of the power is generated by fossil fuels, another portion of the power is generated by the regenerative generator and fluctuations in the power generated by the regenerative generators are compensated for by the storage station. If less power can be fed in permanently by the regenerative generators than is required, this additionally required power can be generated by the fossil fuels mentioned. This also prevents the storage station from outputting all of its stored energy due to this increased power requirement and then no longer being able to compensate for fluctuations in the power fed in by the regenerative generators, or being able to compensate therefor only to a limited extent.

A control concept may be such that an attempt is made to keep the storage station approximately at a medium state of charge. The storage station then thus has stored about half as much energy as it could store based on its storage capacity. With such an average state of charge, both a power increase and a power reduction of the regenerative generators can be compensated for, because to compensate for a power increase, the storage station has to consume power, which is why it must not be fully charged, whereas it has to output power when the power of the regenerative generators decreases and therefore must not be fully discharged.

In fact, however, it is often the case that the power of the regenerative generators does not fluctuate exactly around a fixed mean value, but for example tends to increase, for example because the wind is increasing, or tends to decrease, for example because the wind is decreasing, to name just one example. That is to say if, for example, the power of the regenerative generators tends to drop in a situation, it would be desirable for the storage station to be charged to a state of charge of more than 50%. Even if such a scenario were known at an early stage, that is to say if it were known at an early stage that the electrical power that regenerative generators are feeding into the island network is falling, a corresponding charging of the storage station with regard to such an expected situation is nevertheless not possible or not easily possible.

First of all, the question arises as to where such energy that is needed to charge the storage station should come from. One possibility would be to operate a diesel generator sufficiently to achieve such charging of the storage station. For such a diesel generator, however, it is often not desirable to operate it at high power, because this can increase its wear and reduce its service life. In addition, rapid load changes are not recommended for such a diesel generator or other generation unit based on fossil fuels.

The German Patent and Trademark Office has researched the following prior art in the priority application for the present application: WO 2011/140111 A2; DE 10 2014 221 555 A1; US 2011/0221276 A1; US 2014/0184136 A1; US 2019/0052088 A1; EP 3 007 302 A1; US 2018/0223804 A1.

BRIEF SUMMARY

One or more embodiments of the present application are directed to an electrical storage station having a state of charge that is as adapted to situation as possible, but which can be achieved at the same time with the lowest possible load, while at the same time fluctuations in the renewable sources are compensated for.

A method for operating an electrical storage station is proposed. An electrical storage station is thus operated on an electrical supply network. The electrical supply network is preferably an island network, which is characterized in that the sum of the rated powers of all generators is less than 1 gigawatt (GW).

In any case, the electrical supply network has, in addition to electrical consumers, at least the electrical storage station for taking up and outputting electrical storage power. A plurality of storage stations can also be provided.

Furthermore, the electrical supply network has at least one wind power installation to generate electrical power from the wind and to feed it in at least partially. The method includes the following steps.

One step is to generate electrical power by way of the at least one wind power installation. This power generated in this way is referred to as generated wind power. A further step consists in feeding a feed-in power into the electrical supply network. This electrical feed-in power results at least from the generated wind power and a storage power taken up or output by the storage station. If the storage station thus outputs storage power, the electrical feed-in power results as the sum of the magnitudes of the generated wind power and the storage power output by the storage station. If the storage station takes up storage power, the electrical feed-in power results at least from the generated wind power minus the storage power taken up by the storage station.

Furthermore, it is proposed that the feed-in power is fed into the electrical supply network depending on a state of charge of the storage station and that it is controlled depending on a wind forecast and/or a power forecast. In particular, it is proposed here that a wind forecast is taken into account and, for example, it is taken into account whether increasing wind or decreasing wind is to be expected, to name one example. If, for example, the wind is expected to decrease, the feed-in power can be fed in in such a way that the state of charge of the storage station increases. In other words, for example, less than the generated wind power can then be fed into the electrical supply network. The storage station then thus takes up storage power. This also depends on the state of charge. For example, if the state of charge is high, the feed-in of the feed-in power can be controlled in such a way that the storage station only receives a small amount of storage power, to name another example.

A power forecast can also be used instead of the wind forecast. In this case, instead of meteorological information about the wind, a derived variable is already included, specifically the power forecast as the expected power. The power forecast can be derived from a wind forecast, but it is also possible for a power forecast to be recorded directly as an expected power or a change in power. It is also possible to consider a combination in which a power forecast is derived from a weather forecast, for example, and this is compared with current power values of the relevant wind power installation or wind power installations.

For feeding in the feed-in power, it is further proposed that this be done in such a way that changes in the feed-in power over time are controlled depending on the wind forecast and/or the power forecast and that at least one limit gradient is specified for the changes in the feed-in power in order to limit the changes in the feed-in power thereto, and wherein the at least one limit gradient is specified depending on the wind forecast and/or the power forecast.

It is thus proposed that it is not absolute values of the feed-in power that are controlled but changes over time and that this takes place depending on the wind forecast and/or the power forecast. At least one limit gradient is specified for this. A limit gradient of this type therefore denotes the maximum permissible change in the feed-in power over time in terms of magnitude. Such a limit gradient can be represented graphically as a rising edge over time if it limits a positive change in the feed-in power and it can be represented as a falling edge over time if it limits a negative change in the feed-in power over time in terms of magnitude. A positive limit gradient and a negative limit gradient are preferably provided. The positive limit gradient thus limits positive changes and the negative limit gradient thus limits negative changes in terms of magnitude.

For this purpose, it is further provided that the at least one limit gradient is specified depending on the wind forecast and/or the power forecast. The at least one limit gradient, in particular the positive limit gradient and the negative limit gradient, are therefore not fixed but are variable. If, for example, in the case of a wind forecast that predicts a falling wind or a power forecast that predicts a falling wind power, the feed-in of the feed-in power is to be controlled in such a way that the state of charge of the storage station increases, this can be achieved by specifying the at least one limit gradient. A positive limit gradient can be specified for this purpose, for example, which prevents the feed-in power from increasing too quickly or limits the increase in the feed-in power. This can then have the effect that the feed-in power does not increase as much as it would without the positive limit gradient mentioned by way of example. This results in excess power, which is specifically not fed in due to the positive limit gradient mentioned by way of example and which thus increases the state of charge of the storage station.

A change in the feed-in power can be brought about in particular by the behavior of the consumers in the electrical supply network. The storage station can compensate for such changes in the power demand by the consumers. To the extent that it cannot compensate for such changes in the power demand by the consumers, a generator based on fossil fuels can provide such compensation. Such compensation by generators based on fossil fuels should be kept as low as possible by the storage station. The proposed specification of at least one limit gradient can thus ensure that such compensation by generators based on fossil fuels is kept low, although the state of charge of the storage station can be adjusted depending on a wind forecast and/or a power forecast.

In addition or as an alternative, it is also possible for a time profile to be specified for the feed-in power. This can also be referred to as schedule operation with storage support. In the case of such a specification of a power profile, specifically a power profile over time, it is specified how the feed-in power should change. This change can also depend on the wind forecast and/or power forecast.

For example, such a power profile can be specified in order to take account of the expected change in power. This may mean, for example, that in view of an expected decrease in wind and therefore an expected decrease in power, specifically a decrease in the generated wind power, a corresponding reduction in the feed-in power is specified. In particular, this can be transmitted to a network operator as a proposed or thus guaranteed power profile. The network operator then relies on the fact that the change in power is also actually carried out exactly as it was communicated to them. The at least one wind power installation together with the storage station must then ensure this power profile. The at least one limit gradient can also be specified for this in order to thereby influence the state of charge of the storage station in such a way that it can implement the specified power profile.

When specifying a power profile, it is also considered that this should not exhibit excessive changes in the power, that is to say excessive changes in the feed-in power. That is to say if, depending on the wind forecast and/or the power forecast, it is identified that an excessive drop or increase in the wind or power is to be expected, the charging station, specifically in particular the state of charge, can be prepared to compensate for such an excessive change. If it is thus forecast that the wind will drop too much, a particularly high state of charge would make sense. However, it is also possible that an excessive increase in the wind and thus in the power was predicted and a lower state of charge may be useful to compensate for this. Precisely this can be controlled by specifying the at least one limit gradient. This control of the state of charge is therefore carried out indirectly by only deliberately limiting the change in feed-in power.

According to one embodiment, it is proposed that a charging process of the storage station and also or alternatively a discharge process of the storage station is counted as a charging cycle. To this end, it is proposed that the storage station and/or the feed-in of the feed-in power is controlled depending on counted charging cycles. A charging cycle is thus a process in which the storage station has been fully charged once and fully discharged once. If, alternatively, only a charging process is considered as a charging cycle or a discharge process is considered as a charging cycle, the result is basically the same, because the storage station cannot be charged multiple times without also being discharged in the meantime. If, for example, the storage station is only discharged and recharged by a third, this can accordingly be counted as a third of a charging cycle, or charging the storage station by 33% and discharging it again three times can be regarded as a charging cycle. In particular, it is provided that only a very high number of charging cycles is relevant here. This also results from the fact that a service life of the storage station is preferably taken into account and such a service life can be assumed to be so long that a very large number of charging cycles have been carried out during this time.

In any case, it is proposed that the storage station is controlled or the feed-in of the feed-in power is controlled depending on counted charging cycles. The number of charging cycles is thus taken into account in the control. This is based in particular on the knowledge that the number of charging cycles can be a measure of the load on the storage station. A cumulative load on the storage station can thus be derived from the number of charging cycles. It is thus particularly proposed that the storage station or the feed-in of the feed-in power is controlled depending on the cumulative load on the storage station. In other words, a more or less aggressive control can be provided and exactly that depends on the cumulative load and exactly this can thus easily be taken into account via the number of charging cycles carried out.

In particular, it is proposed that the at least one limit gradient is specified depending on the charging cycles that have been counted. A correspondingly aggressive or less aggressive regulation, that is to say a faster or slower regulation, can be specified via the selection of the limit gradient. If the counted charging cycles are high, it is possible to select the respective limit gradient to be somewhat smaller in terms of magnitude, that is to say to select a flatter rise in terms of magnitude.

In addition or as an alternative, it is proposed that a cycle forecast is created depending on the power forecast. Such a proposed cycle forecast indicates how many charging cycles are to be expected within a predetermined service life of the storage station. In the simplest case, the number of charging cycles that have been counted in a measurement period can be extrapolated to the cycle forecast for the predetermined service life in proportion to the ratio between the predetermined service life and the measurement period. That is to say that if the measurement period, which can also be referred to as the recording period, were 1/50 of the service life, according to a simple variant, the cycle forecast can be used as 50 times the value of the charging cycles counted in the measurement period. However, more complex possibilities also come into consideration, in which a profile of the number of charging cycles is considered, from which extrapolation to a further profile to be expected can be carried out.

In this case, it is preferably proposed that the storage station and/or the feed-in of the feed-in power is controlled depending on the cycle forecast. In this way, the number of charging cycles can also be included in the control, specifically via the cycle forecast.

It is particularly advantageous that a predetermined service life of the storage station can be maintained particularly by specifying one or more limit gradients. It is also possible here that the frequency of the charging cycles can be changed by changing the one or more limit gradients. This also changes the number of charging cycles and also the cycle forecast. The change in the cycle forecast can then also be used to identify whether the change in the one or more limit gradients, or another control adjustment, has changed the future number of charging cycles in the desired way, or whether further adjustments to the one or more limit gradients for readjustment should be changed.

According to one embodiment, it is proposed that the power forecast is a prediction of an expected power or an expected power profile, specifically a power or a power profile, which the at least one wind power installation can feed into the electrical supply network in a prediction period. The power forecast is therefore a prediction about power that can be fed in from the at least one wind power installation. Preferably, this is not just an absolute value, but rather a time profile.

With regard to the power forecast, it is further proposed that this is also determined or adjusted depending on locally recorded values, wherein the locally recorded values have at least one of the following values.

A locally recorded value can be an installation power that is output by the at least one wind power installation. The power forecast can then be adjusted by comparing the current forecast value with the current actual power value, that is to say the installation power that is actually output at that moment. If there are differences here, such a difference can adjust them accordingly, based on the further forecast values, specifically those lying in the future. This is therefore based on the assumption that the power forecast at least also contains the current value of the respective instantaneous point in time and is directed from there into the future. However, it is also possible for the forecast to start even earlier, specifically in the past, or for forecast values from the past to be taken into account. If such forecast values from the past can also be taken into account and compared with corresponding actually generated power values, that is to say corresponding values of the installation power that is output, an even more targeted adjustment of the power forecast is possible.

Basically, specifically for each embodiment, it is proposed to calculate forecast values using a prediction model.

Two options for improving the forecast values using locally recorded values are proposed and are described below based on the installation power that is output. Instead of or in addition to the output installation power, other locally recorded values can also be used and taken into account in the same way as the installation power. These options for improving the forecast values can also be referred to as learning or adaptive methods.

According to the first option, earlier forecast values are compared with real measured values, in particular in this case with the installation power that is output. However, the wind speed also comes into consideration. Depending on this, the future forecast can then be improved by, for example, determining and using at least one correction factor, which can also be referred to as a weighting. The at least one correction factor can also be variable and depend in particular on the amplitude of the forecast values.

According to the second option, a plurality of prediction models are used, in particular two prediction models, specifically a current model that is to be used and adjusted, that is to say adapted, and a reference model that essentially serves as a reference for adjusting the current model. The current model can also be referred to synonymously as the current prediction model and the reference model can also be referred to synonymously as the reference prediction model. These, but also other, prediction models calculate a weather prediction, in particular a wind forecast, or a power forecast for a forecast period from weather input data. Insofar as the following explanations are given for a wind forecast, they can also be applied analogously to a power forecast. Current and/or previous satellite images and/or current and/or previous information about air pressure, air humidity and air temperature can be used as weather input data.

In addition or as an alternative, an external wind forecast, which is provided externally, in particular by a weather service, and locally recorded values can be used as weather input data. If an external wind forecast and locally recorded values are used as weather input data, the external wind forecast can be improved as a result, in particular it can be adjusted to the installation site.

It is also considered that, using an external wind forecast and locally recorded values, the prediction models, at least the current model, calculate an improved power forecast.

The wind forecast is a prediction of an expected wind speed or an expected wind speed profile and it is basically a time profile over the forecast period, which can extend over one or more weeks, for example. Unless otherwise explained, explanations of the wind forecast can be transferred analogously to a power forecast, which is a forecast of an expected power or an expected power profile.

In a learning phase, the current model, and optionally also the reference model, is trained. Historical data, that is to say data from past periods, can be used for this. For this purpose, weather input data that was available at the beginning of the past forecast period can be used for a past forecast period that may be, for example, a year ago. From this, with the help of the prediction models, that is to say the current model that is to be trained and the reference model, wind forecasts for the past forecast period can be calculated, that is to say forecast. In addition, it is also known for the past forecast period which actual past profile of the wind speed occurred at that time.

The wind forecasts of the past forecast period can thus be compared with the actual past profile of the wind speed. A correction or adaptation of the current model can then be made from the difference between the wind forecast of the current model for the past forecast period and the actual past profile of the wind speed of the past forecast period, which can also be referred to as an adjustment. Such an adaptation can be made for further past forecast periods and the current model can thereby gradually be improved further. The adaptation can be made by one or more correction values. In the simplest case, only one correction factor or amplification factor or weighting factor in the current model can be adjusted during the adaptation.

In addition, a model deviation, in particular a deviation or a deviation value, between the wind forecast of the current model and the wind forecast of the reference model is recorded in the learning phase, that is to say for the past forecast period. The model deviation describes a deviation between a wind forecast determined by the current model and a wind forecast determined by the reference model. If the adaptation is carried out gradually for a plurality of past forecast periods, the model deviation or the deviation value that was present after the last adaptation, that is to say the most recent deviation value, can be used.

In an application phase in which the prediction models are applied in reality, they receive current weather input data and use them to calculate a respective wind forecast for a forecast period. Further adjustments to the prediction models, at least to the current prediction model, can be made from deviations in the wind forecast with the wind speed profiles that then actually occur.

At the beginning of the forecast, that is to say at the start of the forecast period, however, the actual wind speed profiles are still in the future. This means that still no deviations in the wind forecast can then be detected with the wind speed profiles that actually occur. It is therefore proposed that a model deviation, in particular a deviation value, between the forecasts of the current model and of the reference model should also be recorded in the application phase and that the current model should be adapted depending on this. In particular, it is proposed to compare the model deviation of the application phase with an earlier model deviation, in particular with a model deviation of the learning phase, and to carry out an adaptation depending on this. In particular, it is proposed that the adaptation be carried out when the model deviation of the learning phase is greater than the model deviation of the application phase in terms of magnitude, and it is then proposed in particular to change at least one correction factor or amplification factor of the current model in such a way that the model deviation is reduced in terms of magnitude.

The reference model can be configured more simply than the current model and/or have a lower order than the current model. The reference model can be of the first order or even only of the zeroth order, thus outputting a straight line or even just a horizontal line as the wind forecast depending on time. In contrast, the current model may be of the second or higher order and/or exhibit a non-linear relationship.

It has specifically been recognized that such a simplified model can still serve as an orientation for the more complex model. Compared to the simplified reference model, the current model can create a wind forecast with a more precise profile, which in particular can take fluctuations into account better than is the case with the simplified reference model. It is therefore not desirable for the model deviation to be reduced to zero, as this would mean that the current model could not create a more detailed wind forecast than the simplified reference model. However, if the model deviation increases in the application phase compared to the model deviation in the learning phase, this is still a sign that the current model may have deteriorated.

The fact that such an increase in the model deviation can indicate a divergence of the current model or its wind forecast can be given as clear explanation. It is therefore proposed to then adjust the current model in such a way that the model deviation is reduced in terms of magnitude, in particular to the value of the last model deviation of the learning phase.

The model deviation can be calculated as the sum of the magnitudes of individual deviations between the compared wind forecasts. The individual deviations can, for example, be recorded at predetermined measurement intervals. Such measurement intervals can be in the range of from one minute to one hour, in particular in the range of from 5 minutes to 15 minutes.

The model deviation can be determined or evaluated using the following methods. The least squares method comes into consideration, in which the sum of the squares of the deviations is thus the smallest. Another method is to look at the sum of the absolute errors, that is to say the sum of the magnitudes of the deviations. Another method is to consider a mean deviation, in which particularly a systematic error can be evaluated, for example if the output of one model is generally greater than the output of the other model, or vice versa. It is preferably proposed to consider a relative or percentage mean of a model deviation. Magnitudes of the deviations of the model outputs are each set in relation to one of these model outputs, in particular in relation to the output of the reference model, and these deviations standardized in this manner are added up and can also be divided by the number of deviations considered and/or can be specified as percentage values.

This method according to this second option is preferably used online, wherein the prediction model applied, in particular its at least one correction factor or amplification factor, is changed online. The correction factor or amplification factor can also be referred to as a weighting or weighting factor.

A further locally recorded value for use in adjusting the power forecast is a wind farm power that is output by the wind farm, that is to say if at least one wind power installation is operated with other wind power installations in the wind farm. An adjustment can be made here in a very similar way to that as has been explained for the installation power that is output. When using the wind farm power that is output, a better adjustment can sometimes be achieved because a plurality of wind power installations or output powers of a plurality of wind power installations are considered and power fluctuations of individual wind power installations are therefore less important.

Another locally recorded value that can be taken into account is a wind speed measured by the at least one wind power installation or in the region of the wind power installation or in the wind farm. Here too, at least the current wind speed can be compared with a current forecast value in order to adjust the power forecast. It is also possible here that an expected power is calculated from the current wind speed and this is used to align the power forecast. It is also possible for a currently recorded wind speed to be compared with a wind forecast and for the wind forecast to be adjusted in order thereby ultimately to adjust the power forecast.

Another locally recorded value that can be taken into account is a rotational speed of the at least one wind power installation. This is based in particular on the knowledge that a wind power installation, at least if it has a variable rotational speed, has a wind-speed-dependent rotational speed due to its operational management. The operating state of the wind power installation can thus be read from the rotational speed of the wind power installation. This can then be used to adjust the power forecast, since deviations between a current forecast value and power values that can be ascertained from the current operating point can also be made here.

Another locally recorded value that can be taken into account is a blade angle of at least one rotor blade of the at least one wind power installation. Particularly in full-load operation, when the wind speed is above a rated wind speed, a wind power installation is adjusted to a power value, in particular a rated power, by means of blade adjustment. At the same time, it is in this case usually adjusted to a maximum rotational speed value, in particular a rated rotational speed. The blade angle thus allows conclusions to be drawn about the current operating point. The power forecast can be adjusted accordingly depending on this operating point. Alternatively, a wind forecast can be adjusted.

It should be noted here that, in full-load operation, especially when the wind speed is far above the rated wind speed, the power that can be generated and its forecast should hardly differ from each other, specifically in both cases should be rated power, nevertheless potential power, that is to say powers that in theory could be generated when the limit set by the rated power is exceeded can differ between the current value and the forecast value. This can be taken into account by considering the blade angle, which provides information about the power that can potentially be generated.

An installation availability of the at least one wind power installation comes into consideration as another locally recorded value. This can also be used for a plurality of wind power installations that are operated in a common wind farm. The power forecast can be adjusted from such an installation availability. One option is that, due to previously known dates, such as for example a maintenance interval, failures of one or more wind power installations are already known in advance and an adjusted power forecast can be derived from this. For example, for a period in which it is known that one in 10 wind power installations in a wind farm will fail due to maintenance, the power forecast, which initially does not take this failure into account, can be reduced to a value of 90% of the value that the power forecast has ascertained without knowledge of this failure.

It is preferably proposed that a respective time profile of values and/or a sequence of values is recorded and/or taken into account for one, several or all of the locally recorded values. It is thus not only individual values that are recorded, but their profiles too. Accordingly, it is also proposed to compare the corresponding profiles with corresponding profiles of the wind forecast to be adjusted.

According to one embodiment, it is proposed that the wind forecast and/or the power forecast is determined depending on a weather forecast obtained externally, in particular from a weather service, and is adjusted depending on a local adjustment rule. Thus, a weather forecast from an external provider, which is thus not locally limited to the region of a wind farm, forms the starting point for the wind forecast or power forecast. A power forecast is rarely offered by external weather services, especially since knowledge of the wind power installation would be necessary for this, but from a weather forecast that includes a wind forecast, an associated power and thus power forecast can be calculated for a wind power installation or a wind farm given appropriate knowledge of the wind power installation or the wind farm.

Differences between the weather forecast and the power forecasts derived from it can be recorded, especially through preliminary investigations that were carried out when measuring the installation site of the wind power installation or wind farm, but also based on current measured values of an operated wind power installation or an operated wind farm. An adjustment rule can be derived from this. Such an adjustment rule can also be determined via a simulation.

To give a clear, greatly simplified example, an adjustment rule could be such that it was identified that the power that can be generated in a wind power installation or wind farm is for example always 10% above the value that results from a regional weather forecast for this wind power installation or this wind farm. The adjustment rule can then subtract out this exemplary 10% again. However, it is also possible that there is no generally valid value, but rather that the adjustment rule depends on further information, such as a wind direction and also a wind speed, for example.

Preferably, it is proposed that the adjustment rule be adapted, particularly taking into account at least one locally recorded value. A locally recorded value or a plurality of locally recorded values according to all of the above-mentioned locally recorded values are particularly suitable for this purpose.

According to one embodiment, it is proposed that a feed-in schedule is created and issued for external use. In particular, it is proposed that this be issued to a network operator for use by the network operator. The network operator can then plan better based on this feed-in schedule.

A feed-in schedule is a plan that specifies a feed-in or possible feed-in of electrical power into the electrical supply network over a planning period. To this end, it is proposed that the feed-in schedule be created depending on the wind forecast and/or depending on the power forecast, and also depending on locally recorded values and depending on the state of charge of the storage station. The locally recorded values can in particular be such as have already been explained above for the adjustment of the power forecast or wind forecast. The feed-in schedule is preferably created depending on the at least one limit gradient.

This feed-in schedule can therefore be used to provide the network operator with information about the feed-in power they can expect from the storage station together with the at least one wind power installation. From the point of view of the network operator, the storage station can be viewed together with the at least one wind power installation, in particular together with a wind farm, as a common generator or feed-in system. The wind power installations of such a wind farm in this case form the actual generators, which without a storage station either would be subject to large fluctuations or, in order to avoid fluctuations, have to be operated predominantly in a regulated operating mode. Such a system can also be referred to as a wind power system, which has one or more wind power installations or a wind farm and a storage station.

In particular, it is proposed that the feed-in schedule be created depending on the at least one limit gradient. The at least one limit gradient defines how much the feed-in power may change. The feed-in schedule can further improve such a specification of the limited change in the feed-in power by not only complying with the one or more limit gradients, but also by indicating even more precisely which changes are to be expected. At the same time, these changes must be within the range that is specified by the at least one limit gradient. If it turns out that a limit gradient cannot be maintained or can only be maintained with great effort, it is also possible to adjust this limit gradient accordingly and to make the corresponding adjustment available externally as information, in particular to transmit it to a network operator.

According to one embodiment, it is proposed that a forecast quality, which indicates an estimate of an expected deviation of the occurring wind from the wind forecast or the generated power from the power forecast, is determined for the wind forecast and/or for the power forecast. To this end, it is further proposed that the changes in the feed-in power over time, in particular the at least one limit gradient, are/is specified depending on the forecast quality.

This is based in particular on the idea that the at least one limit gradient is used to specify the framework within which the feed-in power may or should change. The network operator particularly is interested in such features. Depending on such information, in particular depending on the maximum rates of change, said network operator can, if necessary, control further feed-in units, in particular consult them for feeding in. In this respect, the network operator should be able to rely on the limit gradients of the feed-in power. It is therefore important that the maximum change in the feed-in power, which is specified by the at least one limit gradient, is also maintained as far as possible.

This is based in particular on the knowledge that with a low forecast quality, that is to say if large deviations from the forecast, specifically the wind forecast and/or the power forecast, are to be expected, the magnitude of the at least one limit gradient is specified as rather greater, whereas with a high forecast quality the at least one limit gradient can be specified as rather small in terms of magnitude, because only a few or small deviations from the forecast are to be expected.

However, a limit gradient that is low in terms of magnitude is basically desirable, because this means that only a small change over time is expected. This gives the network operator greater planning security.

Sometimes it is also possible that excessive power changes, that is to say a limit gradient that is too large in terms of magnitude, are sanctioned by the network operator in particular. Contractual penalties can arise or, in extreme cases, the operating license can even be withdrawn. It is therefore fundamentally desirable to specify the respective limit gradient to be as small as possible in terms of magnitude, provided that such a limit can then also be maintained. Correspondingly, a limit gradient that is large in terms of magnitude would be specified as seldom as possible and, in particular, if possible only if a very poor forecast quality makes this necessary.

In addition or as an alternative, it is proposed that the feed-in schedule be created depending on the quality of the forecast. Here, too, the basic idea is that the feed-in schedule can achieve better orientation and planning for the network operator if the size of the deviations to be expected is also taken into account. Such a forecast quality is preferably also transmitted to the network operator as additional information, as a result of which the network operator can improve their planning compared to a variant in which they do not receive the forecast quality.

According to one embodiment, it is proposed that a target state of charge be specified for the storage station. Such a target state of charge can be, for example, 50% of its maximum possible state of charge, or 70%, or even 30%. In particular, such a target state of charge is not always specified in the same way. Specifically, it is proposed that the target state of charge be specified depending on the wind forecast and/or depending on the power forecast.

This is based in particular on the knowledge that an expected increasing wind speed and/or an expected increasing power generated by the at least one wind power installation can make it necessary to store power or energy in the storage station in order to comply with limit gradients. Accordingly, in this case the target state of charge would rather assume a low value such as 30% or even 20%. If a falling wind speed or a falling power production by the at least one wind power installation is expected, a higher target state of charge would make sense in order to offset an excessive power drop in the feed-in power by supporting with power from the storage station.

A wind power system is also proposed. Such a wind power system is provided for feeding electrical power into an electrical supply network, wherein the electrical supply network comprises a plurality of electrical consumers. The wind power system comprises at least one wind power installation to generate electrical power from wind. A plurality of wind power installations can also be provided, and it is also possible for the wind power system to comprise a plurality of wind power installations as a wind farm.

In addition, at least one electrical storage station is provided for taking up and outputting electrical storage power.

The at least one wind power installation has an output unit for outputting electrical power generated from the wind as generated wind power. In this case, the output unit is preferably prepared to feed into the electrical supply network, for example via a network connection point. In this case, for example, a transformer can also be provided, which is provided between the wind power installation and the network connection point. In any case, the output unit can be designed here as an inverter, which outputs the output electrical power generated via a corresponding alternating current generated by the inverter with a corresponding alternating voltage.

However, it is also possible that the wind power installation does not feed all of the wind power that is generated into the electrical supply network because part of the wind power generated, or even 100% of it, is transferred to the storage station.

Furthermore, the wind power system has a feed-in arrangement for feeding a feed-in power into the electrical supply network. Such a feed-in arrangement can comprise an inverter, in particular a bidirectionally operating inverter of the storage station, and it can comprise the output unit of the wind power installation as a further part of the feed-in arrangement. The feed-in can then be carried out at a or the network connection point which has already been mentioned. A network transformer and/or a network circuit breaker may also form part of the feed-in arrangement.

In particular, the wind power system thus performs the feeding of electrical power into the electrical supply network jointly, specifically in such a way that the wind power installation and the storage station participate in the feed-in. They then feed in the electrical feed-in power together. This thus results from the wind power that is generated and a storage power that is taken up or output by the storage station. If the storage station outputs storage power, the feed-in power is made up of the wind power generated and the storage power that is output. However, if the storage station takes up storage power, this must be deducted from the wind power generated and the remainder then forms the feed-in power.

Furthermore, a control device (e.g., controller) is provided for the wind power system in order to control the feed-in of the feed-in power into the electrical supply network, specifically depending on a state of charge of the storage station and depending on a wind forecast and/or a power forecast.

Furthermore, the control device is provided so that the feed-in is controlled in such a way that changes in the feed-in power over time are controlled depending on the wind forecast and/or the power forecast and at least one limit gradient is specified for changes in the feed-in power in order to limit the changes in the feed-in power thereto, and wherein the at least one limit gradient is specified depending on the wind forecast and/or the power forecast.

The control device thus coordinates the feed-in of the feed-in power in the manner mentioned. Locally, the control device can be arranged in this case in a separate station, or in one of the wind power installations, or in the storage station. Such a control device preferably has a communication connection (e.g., data line) to the at least one wind power installation, the storage station and an external control center (e.g., external controller or operator controller) of the electrical supply network, in particular a control center of the network operator of the electrical supply network. As a result, the storage station in particular can be operated depending on the wind power installation and depending on specifications of the control center. In addition, the control device can provide the control center and thus in particular the network operator with information about its power feed-in, so that the network operator can plan accordingly.

The wind power system, in particular the control device, is preferably prepared to carry out at least one method according to at least one embodiment described above. Corresponding method steps can be implemented in the control device for this purpose.

Provision is preferably made for the wind power system, in particular its control device, to have a communication interface for receiving and automatically evaluating at least one weather forecast. Weather forecasts are provided by many providers these days and are also often available for different regions. In principle, computers and other control devices can receive such weather forecasts, provided they have an Internet connection. However, it is proposed here that the communication interface is provided for receiving and automatically evaluating the at least one weather forecast. In particular, targeted adjustments can be provided here in the communication interface, which extracts data required from a weather forecast for further processing. In particular, data regarding wind speeds and wind directions are to be extracted here. These data can then be further processed in the control device. In particular, forecasts can be made depending on this and improved depending on other values.

BRIEF DESCRIPTION OF THE SEVERAL VIEWS OF THE DRAWINGS

The invention is now explained in more detail below by way of example based on embodiments with reference to the accompanying figures.

DETAILED DESCRIPTION

Figure 1:
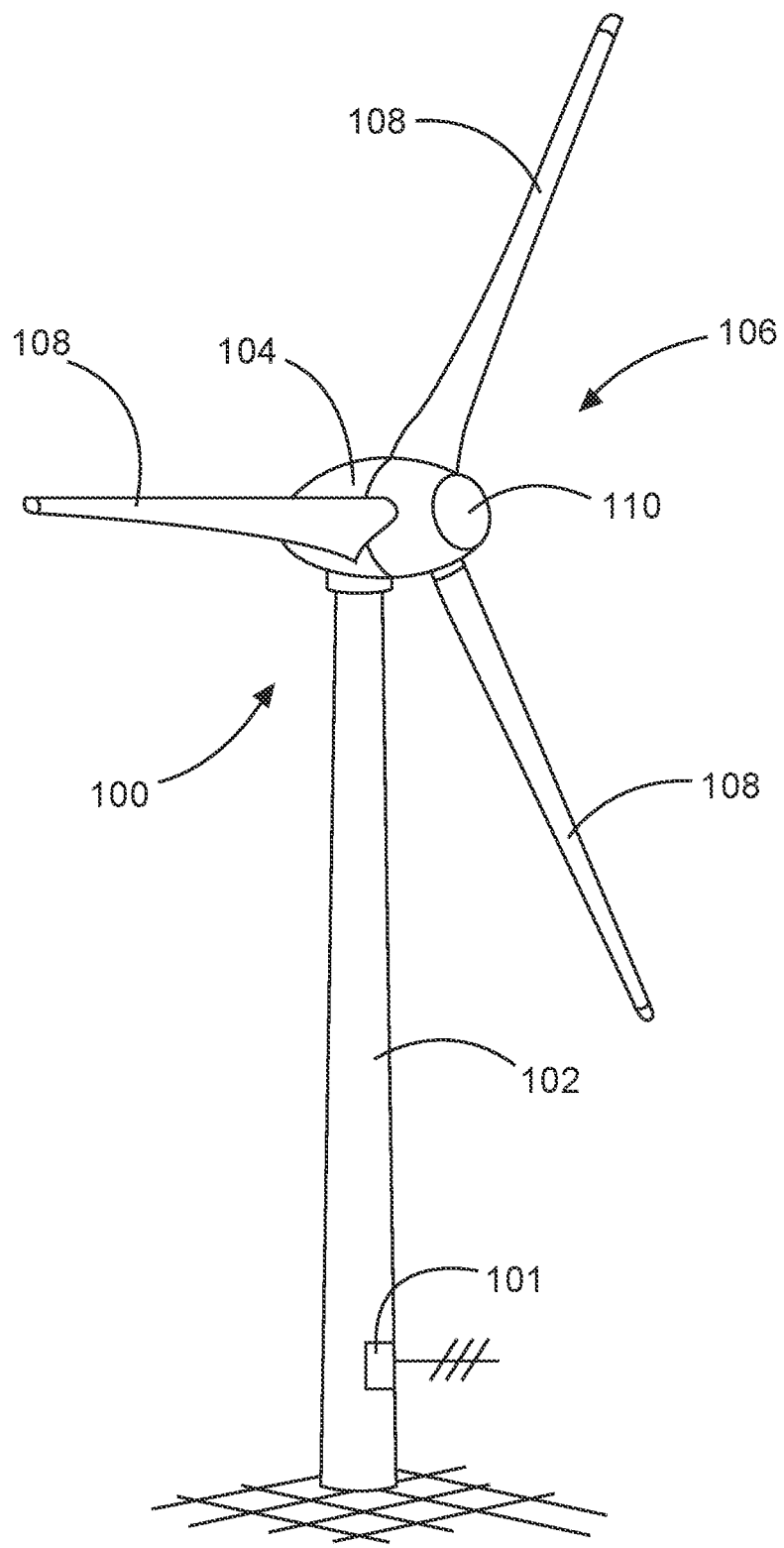
FIG. 1 shows a perspective view of a wind power installation.

FIG. 1 shows a wind power installation 100 comprising an output unit 101, which can be designed as an inverter, a tower 102 and a nacelle 104. A rotor 106 having three rotor blades 108 and having a spinner 110 is provided on the nacelle 104. During operation, the rotor 106 is set in rotational motion by the wind and thereby drives a generator in the nacelle 104.

Figure 2:
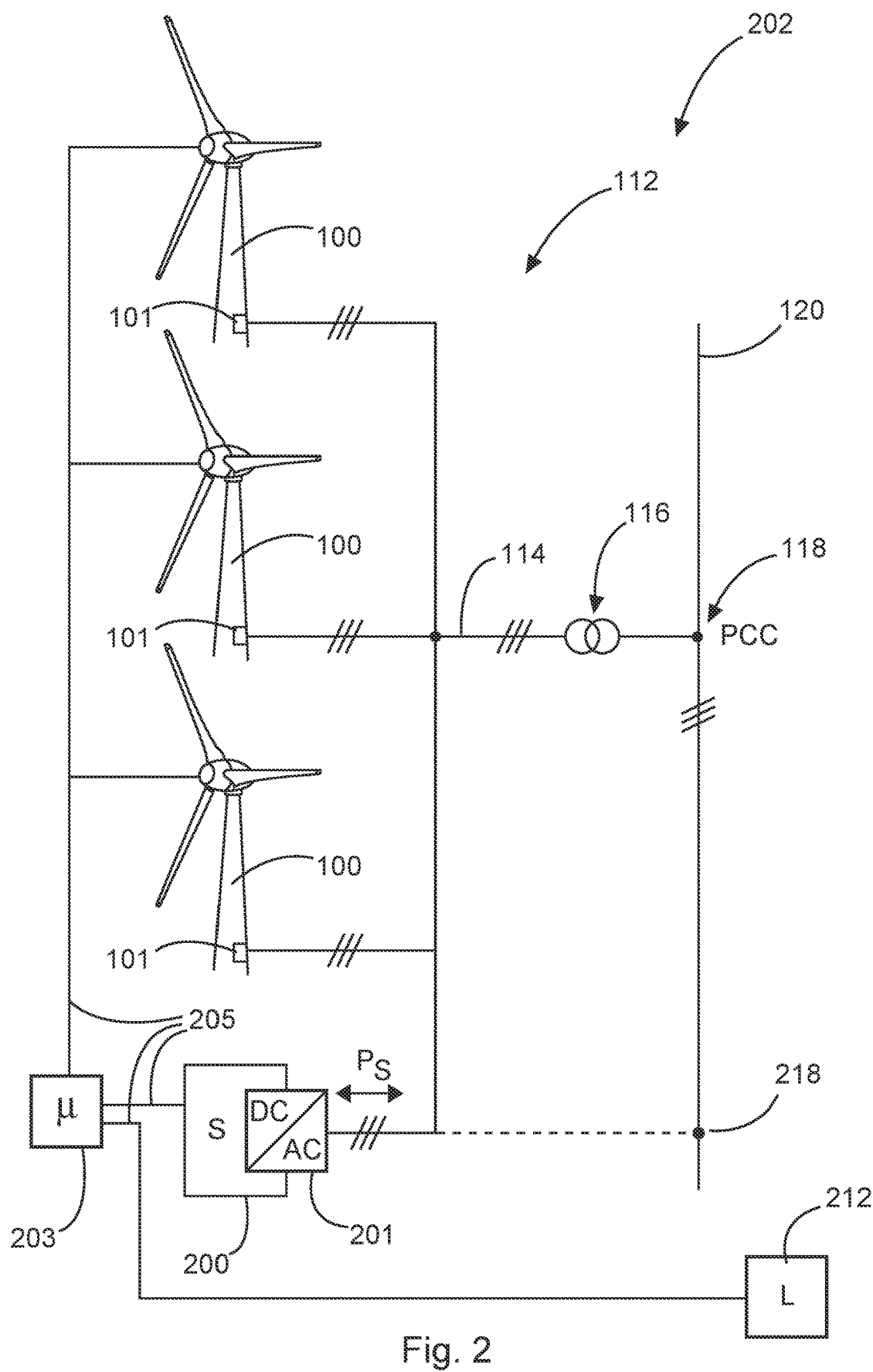
FIG. 2 shows a schematic view of a wind power system comprising a wind farm and a storage station.

FIG. 2 shows a wind farm 112 comprising, for example, three wind power installations 100, which can be the same or different. The three wind power installations 100 are therefore representative of basically any number of wind power installations in a wind farm 112. The wind power installations 100 provide their power, specifically in particular the electricity generated, via an electrical farm network 114. Here, the currents or powers generated in each case by the individual wind power installations 100 are added up and a transformer 116 is usually provided, which can also be referred to as a network transformer and steps up the voltage in the farm in order to then feed into the supply network 120 at the common network connection point 118, which is also synonymously referred to as a point of common coupling (PCC) or feed-in point.

FIG. 2 is only a simplified illustration of a wind farm 112 which, for example, does not show any control of the wind farm, although such a control is of course present. The farm network 114 can also, for example, be designed differently, for example in that a transformer is also present at the output of each wind power installation 100, just to name another exemplary embodiment.

In addition to the wind farm 112, FIG. 2 also shows a storage station (e.g, battery) 200. The storage station 200 can also be connected to the farm network 114 and can then feed into the electrical supply network 120 via said farm network and via the transformer 116 and the common network connection point 118. As an alternative, it is also possible for the storage station 200 to feed into the electrical supply network 120 via its own network connection point 218. For this purpose, the storage station has an inverter 201 that operates bidirectionally. A transformer such as the transformer 116 can also be provided for feeding into the electrical supply network 120 via its own network connection point 218.

The feed-in of electrical power through the storage station 200 also includes negative feed-in, that is to say the withdrawal of power from the electrical supply network and thus the feed-in of this electrical power in the storage station 200. For the storage station 200, a storage power that is output, which is thus fed into the electrical supply network, is preferably regarded as positive power. Since storage power $P_S$ can thus be taken up or output, this is shown in FIG. 2 by a corresponding double arrow.

The wind farm 112 thus forms a wind power system 202 together with the storage station 200. A common control device (e.g., controller) 203 is provided for this purpose, which is coupled to the storage station 200, the wind power installations 100 and a control center (e.g., external controller or operator controller) 212 via a communication link (e.g., data line) 205. The control device 203 can also be coupled to a farm controller, which is not shown here, instead of to the wind power installations 100, or in addition thereto.

Figure 3:
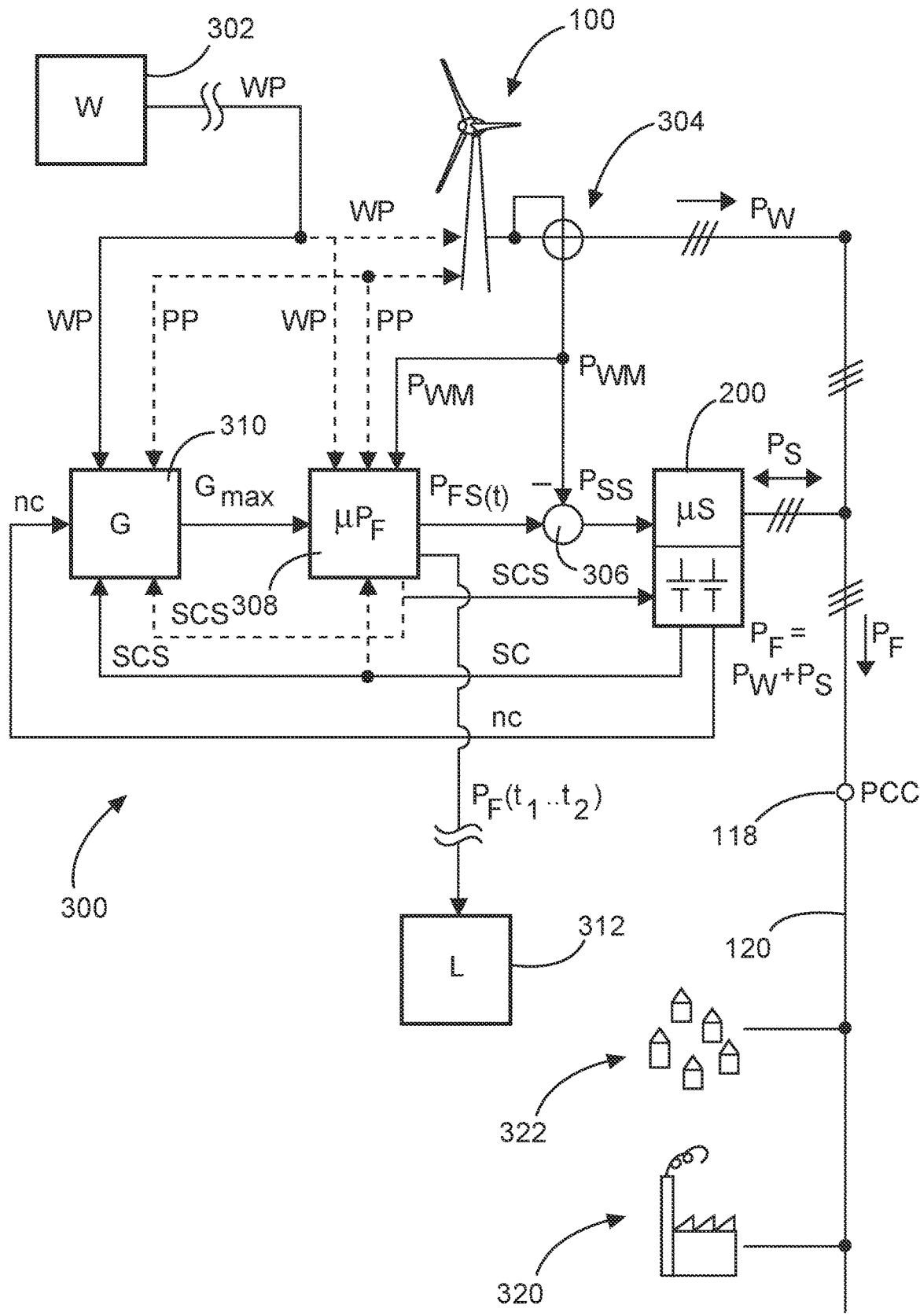
FIG. 3 shows a controlling structure for controlling and thus operating an electrical storage station.

FIG. 3 shows a controlling structure (e.g., controller) 300, which essentially serves to control and thereby to operate the storage station 200. Although the storage station 200 is shown somewhat differently to that shown in FIG. 2, it may correspond thereto. The more detailed illustration of the storage station 200 in FIG. 3 serves only to better explain the control relationships. FIG. 3 also shows an industrial consumer 320 and a locality 322 schematically and representative of other consumers as two possible consumers on the electrical supply network for illustration purposes.

Otherwise, a wind power installation 100 is also indicated in the controlling structure 300, which wind power installation can thus correspond to the wind power installation 100 in FIG. 1 or to a respective wind power installation 100 in FIG. 2. Otherwise, however, the wind power installation 100 in FIG. 3 is also representative of a plurality of wind power installations or else a wind farm 112 according to FIG. 2. Both the wind power installation 100 and the storage station 200 feed power into the electrical supply network 120 and this can be done via the common network connection point 118. Any network transformer such as the network transformer 116 of FIG. 2 can also be provided, but for the sake of simplicity it is not illustrated here.

In addition, the controlling structure 300 uses a weather station 302, which is shown in FIG. 3 but only supplies information, specifically a wind forecast WP in particular. The weather station 302 can in this case be located somewhere else and the transmission of information, specifically the transmission of the wind forecast WP in particular, can also take place wirelessly. The weather station 302 is not part of the wind power system 300. Only one communication interface to the weather station 302 can be part of the wind power system 300.

During operation, the wind power installation 100 feeds in a wind power $P_W$. In addition, the storage station 200 feeds a storage power $P_S$, which can also be negative if the storage station takes up this storage power $P_S$. Both together result in the feed-in power $P_F$, which thus results as the sum of the wind power $P_W$ and the storage power $P_S$:

$$P_F = P_W + P_S$$

Ideally, the wind power installation 100 feeds in as much wind power $P_W$ as is possible due to the prevailing wind. The storage station 200 then adapts to this and feeds in storage power accordingly, that is to say outputs storage power or takes up storage power, in order thereby to stabilize the feed-in power $P_F$.

It is pointed out that the wind power $P_W$, the storage power $P_S$ and the feed-in power $P_F$ actually denote powers in the controlling structure 300 insofar as they are marked with a separate arrow on lines which are also marked as three-phase lines in the controlling structure 300. The remaining connecting lines of the controlling structure 300 only indicate signal lines or data lines on which measured values, setpoint values or other information are transmitted in particular.

The storage station 200 thus obtains a storage power setpoint value $P_{SS}$, which gives the storage station 200 the information about the level of storage power $P_S$ to be output or taken up.

The storage power setpoint value $P_{SS}$ depends here on a feed-in power setpoint value $P_{FS}$ and the wind power $P_W$. The wind power $P_W$ is recorded for this purpose, for example, in the power measurement unit (e.g., power meter or Watt meter) 304 and provided to the summing element 306 as the measured wind power value $P_{WM}$ and there is drawn from the feed-in power setpoint value $P_{FS}$.

The feed-in power setpoint value $P_{FS}$ is determined and output by the feed-in planning block 308. According to the controlling structure 300, the feed-in power setpoint value $P_{FS}(t)$ is indicated as output variable of the feed-in planning block 308. This should make it clear that this feed-in power setpoint value $P_{FS}(t)$ can be a variable that changes over time and can in particular also be output as a time profile. The same can then of course also apply to the other variables, in particular to the storage power setpoint value $P_{SS}$ that is calculated from this. For the sake of clarity, the possible time dependency is not indicated for the other variables, although it can exist.

The feed-in planning block 308 determines the feed-in power setpoint value $P_{FS}$ depending on the measured wind power value $P_{WM}$, depending on at least one limit gradient $G_{max}$, depending on a state of charge SC of the storage station 200 and depending on a power forecast PP or instead of the power forecast PP or additionally depending on a wind forecast WP. The state of charge SC as well as the wind forecast WP or the power forecast PP can be included in this case indirectly via the limit gradient $G_{max}$.

The limit gradient $G_{max}$ is determined in the gradient block 310. The limit gradient $G_{max}$ is also drawn as representative of a plurality of limit gradients. In particular, an upper limit gradient, which thus limits an increase in power, and a lower limit gradient, which limits a decrease in power, can be provided.

The at least one limit gradient $G_{max}$ is determined here depending on the state of charge SC and the wind forecast WP and/or the power forecast PP. In this case, the state of charge SC is particularly taken into account in such a way that, when the state of charge SC is low, the at least one limit gradient $G_{max}$ is set in particular in such a way that an increase in the feed-in power $P_F$ is limited to a greater extent than a reduction in the feed-in power $P_F$. In principle, this can lead to the state of charge SC increasing. Accordingly, a reduction in the feed-in power $P_F$ can be limited to a greater extent than an increase when the state of charge SC is high and should be lowered.

On the other hand, the wind forecast WP can be taken into account in order to be able to anticipate changes in the wind power $P_W$. A power forecast PP from the wind power installation 100 can also be used directly for this purpose. For this purpose, the wind power installation 100 itself can receive a wind forecast as an input variable. The wind power installation 100 may possibly be best able to derive a power forecast PP from the wind forecast WP due to its own behavior and make it available to the gradient block 310. In any case, a change can be foreseen or at least expected on the basis of a wind forecast, that is to say especially a weather forecast, and depending on this it is possible to assess the range in which limit gradients can be maintained at all.

It should be noted that the limit gradients relate to the feed-in power $P_F$. The feed-in power $P_F$ can also be planned in particular by way of one or more limit gradients $G_{max}$ and such planning can be handed over to a network operator. It is therefore proposed that the ranges that are considered for the limit gradients or at least the one limit gradient $G_{max}$ are taken into account depending on a wind forecast WP and/or a power forecast PP.

The at least one limit gradient $G_{max}$ is determined in this way in the gradient block 310 and passed to the feed-in planning block 308. For example, a positive limit gradient in the sense of a temporally rising edge and a negative limit gradient in the sense of a temporally falling edge can be determined and passed to the feed-in planning block 308. Depending on this, the feed-in power setpoint value $P_{FS}$ can then be determined taking into account the measured wind power value $P_{WM}$, that is to say taking into account the currently fed-in wind power $P_W$.

In the ideal case, which also initially serves as an explanation, the wind conditions are stable and the wind power installation 100 feeds in an essentially constant wind power $P_W$. The wind power hardly changes and this can then immediately form the feed-in power setpoint value $P_{FS}$. The measured wind value $P_{WM}$ is subtracted from this setpoint value at the summing element 306 and the result should then be zero. The storage power setpoint value $P_{SS}$ would then thus be zero and the storage station would then need neither to output or take up storage power $P_S$.

However, if the wind fluctuates so strongly that the wind power $P_W$ and thus also the measured wind power value $P_{WM}$ exceed the limits according to the limit gradient $G_{max}$ or the two limit gradients in terms of magnitude, one possibility is that the measured wind power value $P_{WM}$ is used as feed-in power setpoint value $P_{FS}$ as long as the measured wind power value $P_{WM}$ lies within the limits that are specified by the at least one limit gradient $G_{max}$. However, if the measured wind power value $P_{WM}$ reaches the limits specified in this way and if they are exceeded in terms of magnitude, the respective limit value exceeded in terms of magnitude can then be used as the feed-in power setpoint value $P_{FS}$. This is output and the measured wind power value $P_{WM}$ is again subtracted therefrom at the summing element 306. For the values at which the measured wind power value $P_{WM}$ has exceeded the specified limits in terms of magnitude, these exceedances thus result with the opposite sign as the storage power setpoint value $P_{SS}$. This is provided to the storage station 200 and said storage station adjusts the storage power value $P_S$ accordingly and thus compensates for the excessive fluctuations in the wind or wind power $P_W$ via battery power so that the feed-in power $P_F$ stays within the given limits.

The specification of the at least one limit gradient $G_{max}$ depending on the state of charge SC can thus influence how greatly the wind power $P_W$ or its measured value $P_{WM}$ exceeds a positive limit value or falls below a negative limit value at least on average in the short term and can thus specify whether the storage station 200 instead has to compensate for an exceeding power or an undershooting power. Accordingly, the state of charge will decrease or increase, or remain the same. It is therefore proposed to include the state of charge SC when calculating the limit gradient $G_{max}$. The wind forecast WP or the power forecast PP is also taken into account because it also depends on whether an upper limit is exceeded or a lower limit is undershot.

Both the state of charge SC and the wind forecast WP and/or power forecast PP can also be taken into account directly in the feed-in planning block 308. This is considered particularly when the feed-in power $P_F$ should be limited not only to the limits specified by the limit gradient $G_{max}$ but instead should be guided in a more targeted manner, in particular in a range approximately in the middle of two specified limits or two specified limit gradients. Here, it is considered particularly that the feed-in planning block 308 creates a feed-in schedule, according to which the feed-in power $P_F$ that should be fed in is specifically predicted, particularly for a planning period. Such a planning period as a period can reach from a first time $t_1$ until a second time $t_2$. A feed-in schedule can be created for this and output to a network operator so that they can plan better. The output to a network operator can be the output to a control center (e.g., external controller or operator controller) 312. This is indicated in the controlling structure 300 by the fact that the feed-in planning block 308 outputs the feed-in schedule $P_F(t_{1\ldots 2})$ and transmits it to the control center 312.

As a further control option, FIG. 3 also shows that the feed-in planning block 308 determines a target state of charge SCS and takes it into account in the control. This is taken into account in the controlling structure 300 in such a way that this target state of charge SCS is transmitted to the storage station 200. The storage station 200 can take this into account and transmit it to the gradient block 310, for example. The target state of charge SCS can also be transmitted directly to the gradient block 310, which is indicated by dashed lines. The transmission of the target state of charge SCS to the storage station 200 can also achieve a situation in which the target state of charge SCS is directly compared with the state of charge SC. It is then considered that only the difference between the state of charge and the target state of charge is transferred, for example, to the gradient block 310 for further calculation.

A further possibility for improvement is shown in the controlling structure 300, according to which the gradient block 310 additionally takes into account a number of charging cycles nc that have been carried out. The storage station 200 can determine these charging cycles nc and make them available to the gradient block 310. It is also considered that the charging cycles nc are evaluated in the feed-in planning block 308, which is not shown here only for the sake of clarity.

In the controlling structure 300, dashed lines indicate that the wind power installation 100 receives a wind forecast WP and outputs a power forecast PP. In addition to installation properties of the wind power installation, which has already been explained above, it is also considered here that the wind power installation 100 compares the wind forecast WP in each case with actual wind values that occur directly at the wind power installation 100. Alternatively, powers can also be compared here if the wind forecast WP is first converted into a power and this is then compared with the actual power at the wind power installation 100. As a result, a deviation between the forecast created by the weather station 302 and local values at the wind power installation 100 can be identified and a system is preferably identified based on a number of such deviations and the wind forecast WP of the weather station 302 is adjusted depending on this system.

The controlling structure 300 in FIG. 3 also shows that the wind power installation 100 and the storage station 200 feed into the electrical supply network 120 together at the network connection point 118. Although this is a preferred embodiment and is implemented in this way by a proposed wind power system, it is also considered that the storage station is clearly separate from the at least one wind power installation, but feeds it into the same electrical supply network. The power balance is particularly important for the network operator, that is to say to what extent the total power fed in changes. Depending on how greatly the fed-in power changes, the network operator has to or does not have to take countermeasures. Whether the wind power installation 100 or the wind farm 112 is arranged in this case in the immediate vicinity of the storage station 200 and feeds in is of little or no importance to the network operator.

In addition, particularly the proposed method for operating and thus controlling a storage station can also be implemented if, for example, further wind power installations are added to the electrical supply network 120. The storage station can take this into account without being located in the immediate vicinity of the wind power installations or their feed-in point. The storage station can thus also be operated in the explained sense and thus controlled if a plurality of wind power installations are present and taken into account, but are clearly distributed and feed into the electrical supply network via a plurality of network connection points. The storage station only needs information from these wind power installations to be taken into account. In particular, it requires the total power fed in by all the wind power installations under consideration. This sum of the total power fed in by all the wind power installations under consideration can then be used as the measured wind power value $P_{WM}$ in the sense of the structure of FIG. 3.

Likewise, the storage station can be operated and controlled in this sense if a plurality of wind farms are present, which in turn can also be arranged clearly separated from one another and can feed into the electrical supply network via a plurality of network connection points.

A power forecast for a wind farm based on local measurement data is thus also taken into account. This can include wind farm power, power from wind power installations, measured wind speeds, rotational speeds of wind power installations, blade angles of wind power installations, status information from wind power installations and from wind farms or from the storage station.

The power forecast can either be calculated centrally for the entire wind farm or calculated by individual wind power installations on an installation-specific basis and then combined in a wind farm controller.

It is therefore proposed to use the wind forecast and/or a power forecast for one or more of the following applications:

One application is influencing the state of charge of the storage station, that is to say of an energy store of the storage station, depending on expected power profiles of the wind farm, specifically those predicted by the power forecast. Gradient smoothing can be performed or improved based on this. In particular, it is proposed to preset a lower state of charge when the wind farm is expected to have positive gradients, that is to say when the power of the wind farm is expected to increase, and to correspondingly set a higher state of charge when there are negative gradients.

A schedule operation with storage support, that is to say with the support of the storage station, is also proposed, especially the creation of a short-term schedule based on a power forecast, and safeguarding the schedule with energy storage. This can optionally be supplemented by updating a longer-term schedule that can be created on the basis of numerical weather forecasts.

A forecast of the expected charging and discharge cycles of the energy store based on the power forecast for compliance with manufacturer requirements with regard to a lifetime guarantee is also proposed. In particular, an increase in the effectiveness of the energy storage regulation of the storage station is to be achieved. This can be applied in particular to avoid reaching operating limits in the case of long-lasting power gradients if the storage station or its energy store is used for gradient smoothing. Another example is maintaining the service life of the energy store with the best possible utilization of the available charging and discharge cycles.

Better safeguarding of a schedule operation against long-term or inaccurate wind power forecasts can also be achieved.

The invention claimed is:

1. A method for operating an electrical storage station in an electrical supply network,
    wherein the electrical supply network includes:
        electrical consumers;
        the electrical storage station configured to draw and output electrical storage power; and
        at least one wind power installation configured to generate electrical power from wind, and
    the method comprises:
        generating the electrical power using the at least one wind power installation as generated wind power; and
        feeding a feed-in power into the electrical supply network, wherein:
            the feed-in power is an aggregate of the generated wind power and a storage power drawn by or output from the electrical storage station,
            the feeding of the feed-in power into the electrical supply network is controlled depending on:
                a state of charge of the electrical storage station, and
                a wind forecast and/or a power forecast,
            changes in the feed-in power over time are controlled depending on the wind forecast and/or the power forecast,
            at least one limit gradient is set for the changes in the feed-in power to limit the changes in the feed-in power to the at least one limit gradient,
            the at least one limit gradient is set depending on the wind forecast and/or the power forecast.

2. The method as claimed in claim 1, comprising:
    counting a charging of the electrical storage station and/or a discharging of the electrical storage station as a charging cycle; and
    controlling the electrical storage station and/or the feeding of the feed-in power depending on the counted charging cycles.

3. The method as claimed in claim 2, comprising:
    setting the at least one limit gradient depending on the counted charging cycles.

4. The method as claimed in claim 2, comprising:
    determining a cycle forecast depending on the power forecast, wherein the cycle forecast indicates a number of the charging cycles to be expected within a service life of the electrical storage station; and
    controlling the electrical storage station and/or the feeding of the feed-in power depending on the cycle forecast.

5. The method as claimed in claim 1, wherein:
the power forecast is a prediction of an expected power or an expected power profile that the at least one wind power installation feeds into the electrical supply network in a prediction period,
the wind forecast is a prediction of an expected wind speed or an expected wind speed profile at the at least one wind power installation or a wind farm in a forecast period, and
the power forecast and/or the wind forecast is determined or adjusted depending on recorded values, wherein the recorded values are selected from a list including:
an installation power that is output by the at least one wind power installation,
a wind farm power that is output by the wind farm when the at least one wind power installation is operated with other wind power installations in the wind farm,
a wind speed measured by the at least one wind power installation, in a region of the at least one wind power installation or in the wind farm,
a rotational speed of the at least one wind power installation,
a blade angle of at least one rotor blade of the at least one wind power installation, and
an installation availability of the at least one wind power installation.

6. The method as claimed in claim 5, comprising:
recording a respective time profile and/or a respective sequence for one or more of the recorded values.

7. The method as claimed claim 1, comprising:
determining the wind forecast and/or the power forecast depending on a weather forecast obtained received from an external weather service; and
adjusting the wind forecast and/or the power forecast depending on a local adjustment rule determined based on at least one locally recorded value.

8. The method as claimed in claim 1, wherein:
a plurality of prediction models are used to determine the wind forecast or the power forecast, wherein the plurality of prediction models includes at least one current model to be used and a reference model for adjusting the current model,
the current model is trained using a learning phase, and a first model deviation representing a deviation between forecasts of the current model and the reference model is recorded,
the current model is applied in an application phase, and a second model deviation representing a deviation between the forecasts of the current model and the reference model is recorded,
the second model deviation of the application phase is compared with the first model deviation of the learning phase, and
the current model is changed to decrease a magnitude of the second model deviation of the application phase in response to the magnitude of the second model deviation of the application phase being greater than a magnitude of the first model deviation of the learning phase.

9. The method as claimed in claim 8, wherein the current model has a higher order than the reference model.

10. The method as claimed in claim 1, comprising:
determining a feed-in schedule for use by a network operator, wherein the feed-in schedule specifies a feed-in of electrical power into the electrical supply network over a planning period, and the feed-in schedule is determined depending on:
the wind forecast and/or the power forecast,
at least one locally recorded value, and
the state of charge of the electrical storage station.

11. The method as claimed in claim 10, comprising:
determining the feed-in schedule depending on the at least one limit gradient.

12. The method as claimed in claim 1, comprising:
determining a forecast quality for the wind forecast and/or the power forecast, wherein the forecast quality for the wind forecast indicates an estimate of an expected deviation of the wind from the wind forecast, and or the forecast quality for the power forecast indicates an estimate of an expected deviation of the generated wind power from the power forecast.

13. The method as claimed in claim 12, comprising:
setting the changes in the feed-in power over time depending on the forecast quality; and/or
determining a feed-in schedule depending on the forecast quality.

14. The method as claimed in claim 12, comprising:
setting the at least one limit gradient depending on the forecast quality.

15. The method as claimed in claim 1, wherein:
a target state of charge is specified for the electrical storage station, and
the target state of charge is specified depending on the wind forecast and/or the power forecast.

16. A wind power system for feeding a feed-in power into an electrical supply network having a plurality of electrical consumers, the wind power system comprising:
at least one wind power installation configured to generate electrical power from wind, wherein the at least one wind power installation includes an inverter configured to output the electrical power generated from the wind as generated wind power;
an electrical storage station configured to draw and output electrical storage power, and wherein the wind power system is configured to feed the feed-in power into the electrical supply network, wherein the feed-in power is an aggregate of the generated wind power and a storage power drawn from or output by the electrical storage station; and
a controller configured to control feeding the feed-in power into the electrical supply network depending on:
a state of charge of the electrical storage station, and
a wind forecast and/or a power forecast,
wherein;
changes in the feed-in power over time are controlled depending on the wind forecast and/or the power forecast,
at least one limit gradient is set for the changes in the feed-in power to limit the changes in the feed-in power to the at least one limit gradient, and
the at least one limit gradient is set depending on the wind forecast and/or the power forecast.

17. The wind power system as claimed in claim 16, wherein the controller is coupled by communication link to:
the at least one wind power installation,
the electrical storage station, and
a control center of the electrical supply network.

18. The wind power system as claimed in claim 16, comprising:
a communication interface configured to receive at least one weather forecast for evaluation by the controller.

\* \* \* \* \*